(12) United States Patent
Xu et al.

(10) Patent No.: US 10,165,924 B2
(45) Date of Patent: Jan. 1, 2019

(54) WATER TANK WASHING MACHINE

(71) Applicant: NINGBO FOTILE KITCHEN WARE CO., LTD, Ningbo (CN)

(72) Inventors: Hui Xu, Cixi (CN); Yangzhong Lian, Cixi (CN); Dengguang Zhu, Cixi (CN); Feng Zheng, Cixi (CN); Shuai Li, Cixi (CN); Zhongqun Mao, Cixi (CN); Yongding Zhu, Cixi (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 120 days.

(21) Appl. No.: 15/109,285

(22) PCT Filed: Dec. 22, 2014

(86) PCT No.: PCT/CN2014/001149
§ 371 (c)(1),
(2) Date: Jun. 30, 2016

(87) PCT Pub. No.: WO2015/100695
PCT Pub. Date: Jul. 9, 2015

(65) Prior Publication Data
US 2016/0324392 A1 Nov. 10, 2016

(30) Foreign Application Priority Data
Dec. 31, 2013 (CN) .......................... 2013 1 0750968

(51) Int. Cl.
*A47L 15/00* (2006.01)
*A47L 15/42* (2006.01)
(Continued)

(52) U.S. Cl.
CPC ....... *A47L 15/0086* (2013.01); *A47L 15/0089* (2013.01); *A47L 15/26* (2013.01);
(Continued)

(58) Field of Classification Search
CPC ............. A47L 15/0086; A47L 15/4251; A47L 15/4257; A47L 15/4259; A47L 15/4263; D06F 37/18; D06F 37/28; D06F 39/14
See application file for complete search history.

(56) References Cited

U.S. PATENT DOCUMENTS 2,307,363 A * 1/1943 Dunham ................. A47L 15/23
134/103.2
2,320,888 A * 6/1943 Reifenberg ......... A47L 15/4257
220/373

(Continued)

Primary Examiner — David G Cormier
(74) Attorney, Agent, or Firm — Wang Law Firm, Inc.

(57) ABSTRACT

A sink-type washing machine includes a case, a drain board, a water pump and a rotary spray arm; the case includes a sink body and a cover plate; the sink body has a recess which forms a drain region, the water pump is inside the drain region, the drain board covers the drain region, the rotary spray arm is above the drain board, water outlets being in communication with the flow channel in the water pump so that water in the drain region can be sprayed into the washing space and above the drain region. A drain board covers the drain region and a water pump is disposed inside the drain region, the water pump is isolated from the washing region by the drain board, so that the water flowing back to the water pump is firstly filtered by the drain board.

13 Claims, 4 Drawing Sheets

(51) Int. Cl.
*B05B 3/12* (2006.01)
*E03C 1/184* (2006.01)
*A47L 15/26* (2006.01)

(52) U.S. Cl.
CPC .............. *A47L 15/428* (2013.01); *B05B 3/12* (2013.01); *E03C 1/184* (2013.01)

(56) References Cited

U.S. PATENT DOCUMENTS

| | | | | |
|---|---|---|---|---|
| 3,709,236 | A * | 1/1973 | Field | A47L 15/0086 134/104.4 |
| 5,470,142 | A * | 11/1995 | Sargeant | A47L 15/0084 312/258 |
| 9,538,900 | B2 * | 1/2017 | Kutto | A47L 15/4263 |
| 2003/0205255 | A1* | 11/2003 | DeBoer | A47L 15/4257 134/115 R |
| 2010/0205778 | A1* | 8/2010 | Duan | F16B 21/186 16/386 |
| 2011/0018408 | A1* | 1/2011 | Cho | D06F 39/14 312/228 |
| 2011/0050060 | A1* | 3/2011 | Kim | D06F 23/04 312/228 |

* cited by examiner

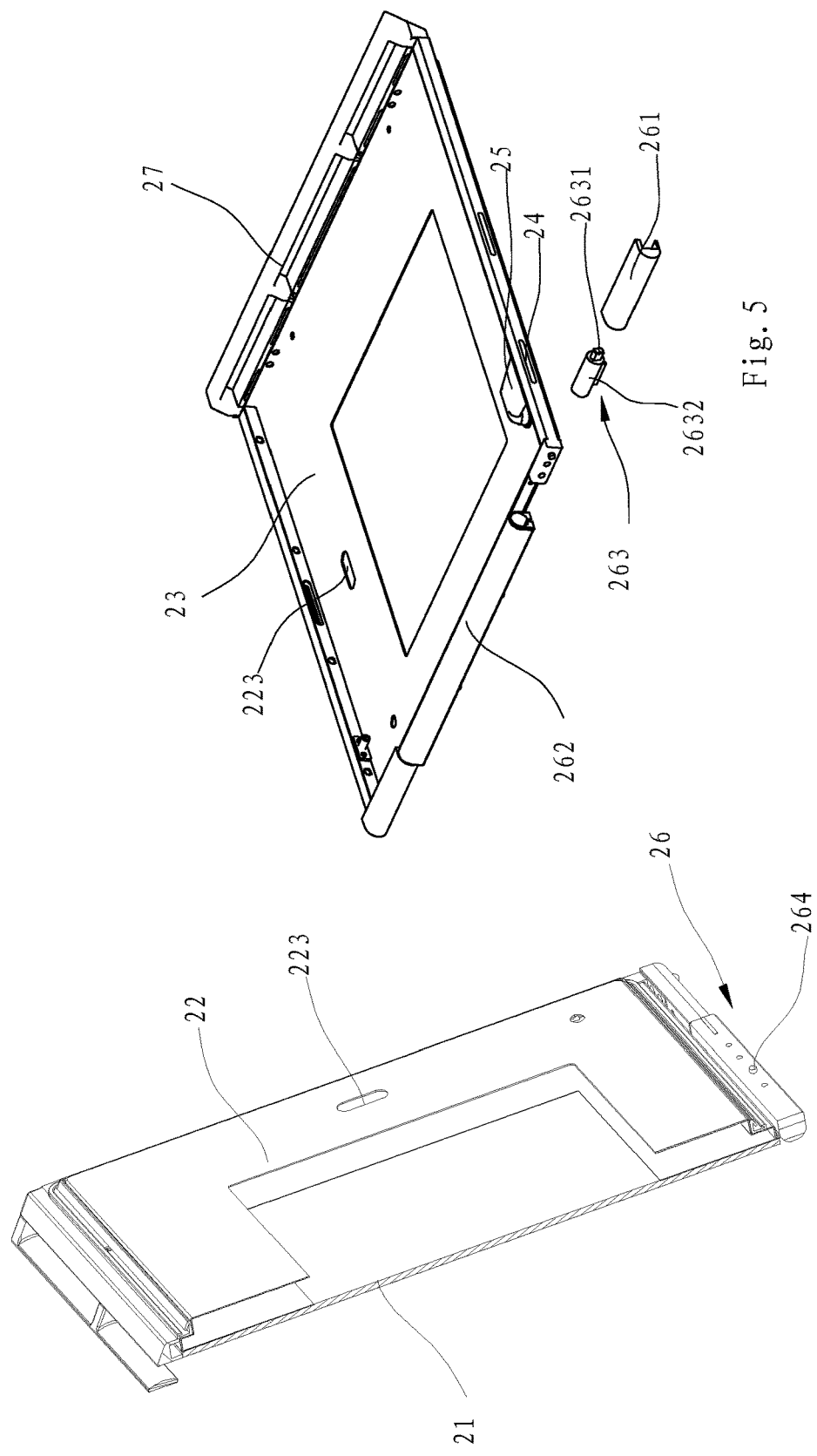

WATER TANK WASHING MACHINE

RELATE APPLICATIONS

This application is a national phase entrance of and claims benefit to PCT Application for a sink-type washing machine, PCT/CN2014/001149, filed on Dec. 22, 2014, which claims benefit to Chinese Patent Applications 201310750968.1, filed on Dec. 31, 2013. The specifications of both applications are incorporated here by this reference.

FIELD OF THE INVENTION

The present invention relates to a washing machine, and in particular to a sink-type washing machine.

DESCRIPTION OF THE PRIOR ART

Dishwasher is a device which sprays cold water or hot water onto dishes to remove dirt on the dishes and washes the dishes. The dishes are placed in a dish shelve inside a dishwasher cabinet. A dishwasher generally includes a pump and a sprayer both for spraying washing water, a heater for generating hot water, and the like. For the existing dishwashers, steam has been used for washing dishes. Compared with the heated water, the use of steam also reduces the time required for washing and improves the efficiency of washing. A disadvantage common to those dishwashers is that a large space is needed. Such dishwashers usually require a standalone casing and dependent components. Accordingly, such dishwashers generally have a large size and are thus not suitable for some families with a large population and a small per-capita living space. Consequently, in many families, the use of dishwashers is less popular.

In order to save the space occupied by the dishwasher, many sink-type washing machine have been newly designed. That is, the existing sinks are refitted as washing machines, and in this case, the sinks are directly used as the washing space. A rotary spray arm is generally provided on the bottom of a sink, and the rotary spray arm is usually connected to a pump driven by a motor. As disclosed in Chinese Patent Application CN101600371A (Application No.: 200880003431.6), titled "Kitchen Sink with a Dishwashing Apparatus, and Water Spray Apparatus Thereof", the water spray apparatus is mounted in a sink basin to spray water for dishes, and the apparatus includes:

a sprayer, the sprayer having drain holes used for spraying pressurized water, supplied by a power supply pump, to wash dishes placed on the bottom of the sink basin by means of a grill;

a fastening means configured to receive the sprayer in a rotating manner in order to mount the sprayer on the bottom of the sink basin;

a rotation driving device configured to operate via the pressurized water supplied by the water supply pump and mounted to rotate the sprayer;

an opening/closing member which moves up and down to, when not in a washing operation, close the drain holes of the sprayer to prevent reflux from the sink basin, and when in a washing operation, open the drain holes of the sprayer; and a lifting device configured to enable the opening/closing member to move up and down.

In such a sink-type washing machine, both the rotary spray arm and the pump are arranged in the washing region, and the water pump is supplemented with water directly from the washing region, so that the supplemented water is inevitably greasy and/or contains food residues. As a result, the operating efficiency and the service life of the water pump are influenced. On the other hand, with regard to the supplementation of water to the water pump, a certain water level is required. Since the entire bottom of the sink is used as the water supplementation region, the larger the area of the sink bottom is, the larger the amount of water needed for washing is. Since the detergent must be maintained in a certain concentration during the washing, a greater amount of detergent is needed, and as a result, waste is caused and it is not environmentally friendly.

SUMMARY OF THE INVENTION

A first technical problem to be solved by the present invention is, in view of the prior art, to provide a sink-type washing machine which can effectively prevent food residues from entering into the water pump during the washing.

A second technical problem to be solved in the present invention is to provide a sink-type washing machine which can effectively reduce the consumption of water for washing without influencing the water supplementation of the water pump.

A third technical problem to be solved by the present invention is to provide a sink-type washing machine which is convenient for observation and can effectively prevent loss of heat in the sink.

To solve the first technical problem, the sink-type washing machine comprises a sink body having a washing space and a bottom portion, the sink body having a recess, the recess defining a drain region at least at a center of the bottom portion;

a water pump disposed inside the drain region for pumping the water in the drain region, the water pump having a flow channel;

a cover plate rotatably connected on the sink body;

a drain board with a plurality of drain holes disposed inside the sink body and covering the drain region;

a rotary spray arm with a plurality of water outlets disposed above the drain board, the plurality of water outlets being in communication with the flow channel in the water pump, wherein water in the drain region can be sprayed into the washing space and above the drain region.

Various existing processes can be used for formation of the drain region. In order to further solve the second technical problem of the present invention, the drain region is preferably formed in such a way that, the bottom portion of the sink body comprises a bottom board, the recess is formed at a center of the bottom board, the drain board covers the recess of the bottom board, the recess under the drain board forms the drain region, and a surface of the drain board is flushed with the bottom board of the sink body around the drain board.

In order to further solve the second technical problem of the present invention, the drain region can be formed in such another way that, the bottom portion of the sink body comprises a bottom board, the bottom board has a hole at a center and a box is disposed under the hole of the bottom board; the drain board covers the box, a space inside the box forms the drain region, and a surface of the drain board is flushed with the bottom board of the sink body around the drain board.

To further solve the third technical problem of the present invention, preferably, the cover plate comprises an upper cover and a lower cover both made of glass and separated by a distance, and the upper cover and the lower cover are bound by a metal frame; a transparent observation window is formed at a center of the cover plate; the dual-layer glass also can isolate heat in the sink body to avoid injury to the user; and the metal frame enhances the strength of the cover plate, which is advantageous for assembling a seal. Such a design of the cover plate is convenient to observe the washing progress and the degree of cleanliness of the washed objects during or after the washing, without opening the cover plate, being useful.

To be able to supplement pressure during the washing, so that the water pump can pump water smoothly, preferably, the metal frame has an air vent in communication with the washing space and an air outlet in communication with outside, the air vent and the air outlet are connected by a pipeline.

To prevent water from sputtering from the sink body during the washing, preferably, a recessed step is provided on an inner circumference of a top of the sink body, and a seal matching with the step is disposed on a circumference of a bottom of the metal frame of the cover plate, and the cover plate is connected with the step of the sink body in a sunken manner, so that water in the sink body is sealed therein. Furthermore, due to the sunken connection manner, even if insufficient sealing occurs because of the ageing of the seal, the leaked water can be limited in the step portion without sputtering from the sink body.

To ensure that the surface of the cover plate can serve as a workbench regardless of whether the washing machine is in the working state, preferably, the upper cover of the cover plate is flushed with an outer edge of the top of the sink body.

To open the cover plate conveniently, preferably, a rear side of the cover plate is rotatably connected to the top of the sink body by a shaft.

To provide a buffering function to the rotation of the cover plate in order to prevent the user from being pinched when the cover plate is covered, preferably, the shaft includes two shaft arms respectively located at two sides of the metal frame and attached to the metal frame, a hollowed positioning bracket with two ends located between the two shaft arms and attached to the sink body, and two damping shafts respectively disposed inside the hollowed positioning bracket and at each end of the positioning bracket, each shaft arm is engaged one damping shaft.

Preferably, the damping shafts can be preferably implemented in such a way that, each damping shaft includes a sleeve attached to the positioning bracket and a core located in the sleeve, and an end of the core is inserted into the shaft arm and engaged with the shaft arm. Since the space between the sleeve and the core is filled with liquid, for example, silicone oil, the resistance between them is increased. Therefore, excellent buffering effect may be provided when the shaft arms and the cores rotate with relative to the sleeve.

To facilitate the positioning the cover plate relative to the sink body, preferably, multiple positioning pins are disposed at intervals on a bottom of the positioning bracket, and multiple positioning holes are formed on the top of the sink body at corresponding positions to the positioning pins.

Compared with the prior art, the present invention has the following advantages:

in the present invention, a drain board covers the drain region and a water pump is disposed inside the drain region, the water pump is isolated from the washing region by the drain board, so that the water flowing back to the water pump is firstly filtered by the drain board, and the operating efficiency and the service life of the water pump are thus improved;

a recessed drain region is only in the center of the bottom portion of the sink body, the drain region maintains a same water holding capacity regardless of the area of the bottom portion of the sink body, so that both the washing water and the detergent are effectively saved;

with the dual-layer glass structure and the composite structure of the metal frame and glass in the present invention, energy-saving and environmental protection are realized, and the strength of the cover plate is enhanced, and furthermore, the arrangement of a seal becomes possible;

a seal is provided at a position where the cover plate is fitted with the sink body to seal water in the sink body therein, in order to prevent water from sputtering during washing to cause injury to people or result in other accidents, and furthermore, due to the sunken connection manner, even if insufficient sealing occurs because of the ageing of the seal, the leaked water can be limited in the step portion without sputtering from the sink body; and the arrangement of damping shafts between the cover plate and the sink body allows the cover plate to stay in a desired position, and provides a buffering function to prevent the user from being pinched when the cover plate is covered.

BRIEF DESCRIPTION OF THE DRAWINGS

FIG. 4 is a cutaway view of a cover plate according to the embodiment of the present invention; and FIG. 5 is an exploded view of a lower cover with a shaft according to the embodiment of the present invention.

DETAILED DESCRIPTION OF THE PREFERRED EMBODIMENT

Figure 1:
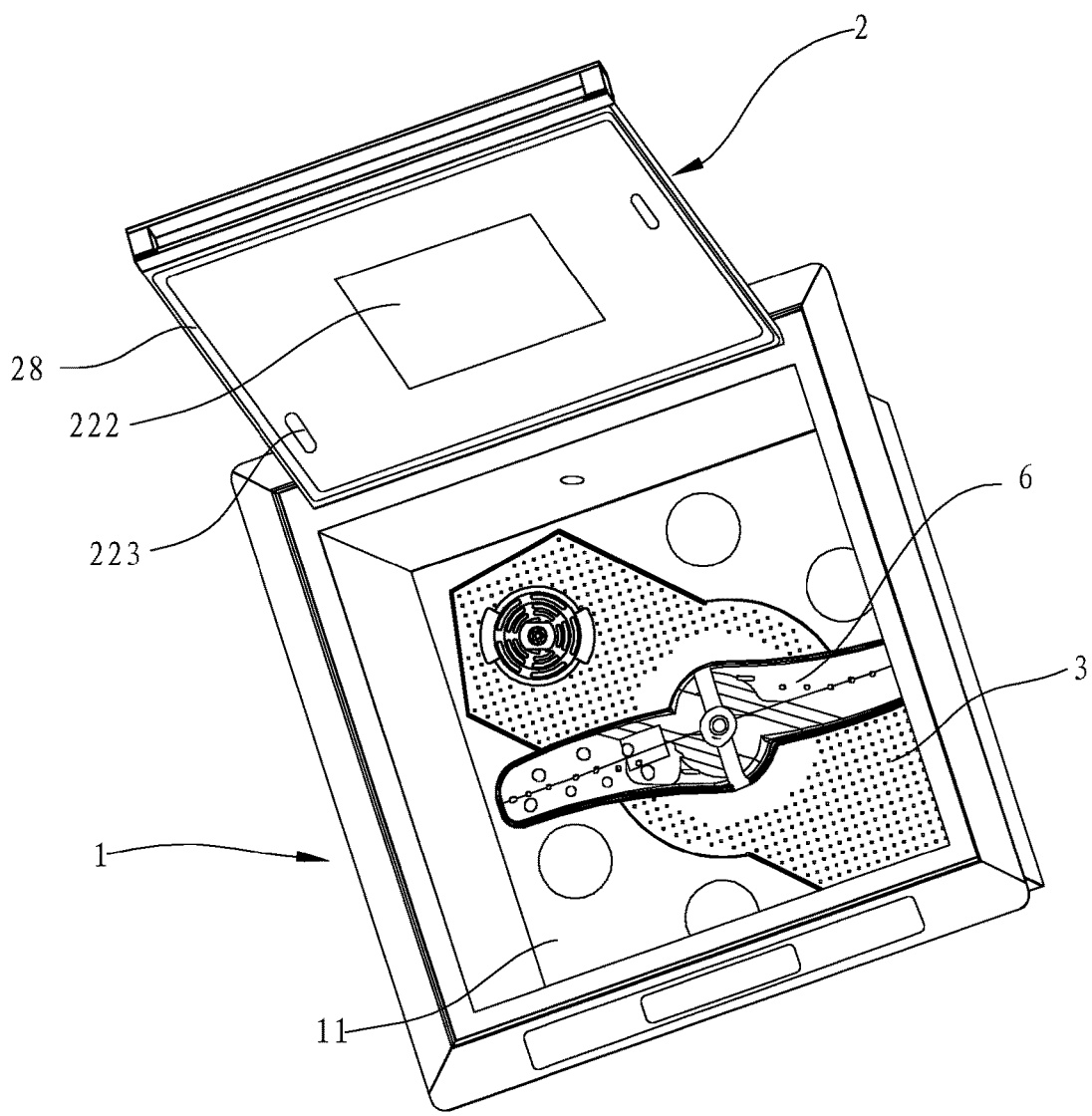
FIG. 1 is a perspective view of a sink-type washing machine according to an embodiment of the present invention.
Figure 2:
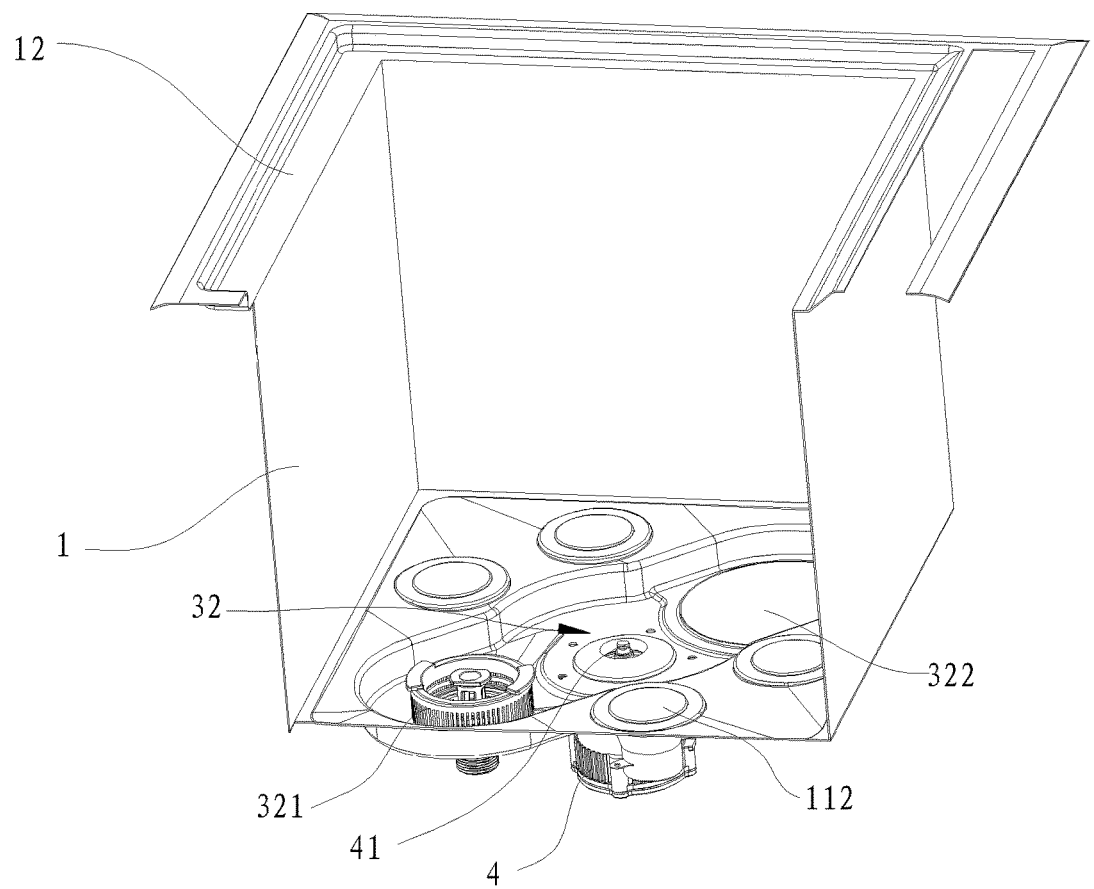
FIG. 2 is a perspective view of a sink body according to the embodiment of the present invention.
Figure 3:
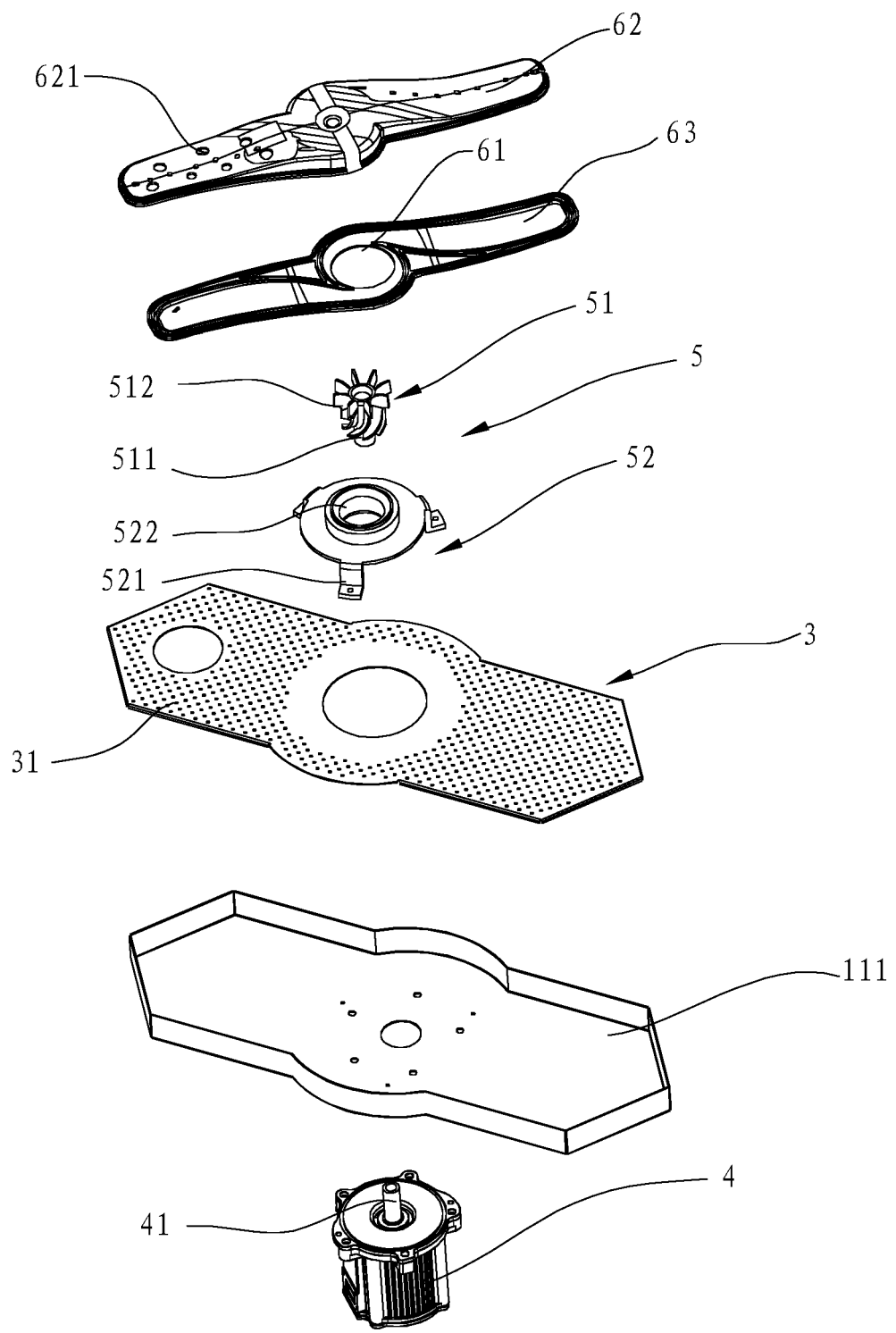
FIG. 3 is an exploded view of partial components of the washing machine according to the embodiment of the present invention.

To enable a further understanding of the present invention content of the invention herein, refer to the detailed description of the invention and the accompanying drawings below:

FIG. 1-FIG. 3 show a preferred embodiment of the sink-type washing machine of the present invention. The washing machine can be used for washing dishes, vegetables, fruits and the like. The washing machine comprises a case with a washing space, a drain board 3, a water pump 5 with a flow channel and a rotary spray arm 6.

The case comprises a sink body 1 and a cover plate 2 rotatably connected on the top of the sink body 1. The sink body 1 can be a common household sink. The washing space is formed between the sink body 1 and the cover plate 2 to accommodate dishes, vegetables, fruits and the like to be washed.

The sink body 1 has a bottom board 11 and a recess at least at a center of the bottom board 11. The drain board 3 having a same shape as the recess is covered over the recess of the bottom board 11, the recess under the drain board 3 forms a drain region 32. The drain board 3 with a plurality of drain holes 31 for drainage. A surface of the drain board 3 is flushed with the bottom board 11 of the sink body 1 around the drain board 3.

Alternatively, in this embodiment, as shown in FIG. 3, the drain region 32 is formed by a box 111, in detail, the bottom board 11 has a hole and a box 111 is disposed under the hole of the bottom board 11, the drain board 3 covers the box 111 and is flushed with other portions of the bottom board 11, a space inside the box 111 forms the drain region 32.

Alternatively, the drain region 32 can be formed as below: the drain board 3 can have a same shape and size as the bottom board 11, and can be entirely located above and spaced apart from the bottom board 11, then a space between the drain board 3 and the bottom board 11 forms the drain region 32.

On the outside of the sink body 1, a motor 4 with an output shaft 41 is provided below the bottom board 11. The output shaft 41 of the motor 4 is inserted into the sink body 1 and located in the drain region 32 above the bottom board 11, or, in this embodiment, as shown in FIG. 3, when a box 111 is used, the output shaft 41 of the motor 4 is inserted into the drain region 32 in the box 111.

A residue basket 321 and a heater 322 are also disposed in the drain region 32. The top of the residue basket 321 is lower than or is flushed with the drain board 3. The residue basket 321 is used for holding residues left after the washing, in order to avoid blocking a water drain pipe in communication with the residue basket 321. The heater 322 is used for heating water in the drain region 32 to obtain better washing effect. An ultrasonic generator 112 is disposed on the bottom board 11 around the drain board 3.

The water pump 5 is disposed within the drain region 32 and spatially spaced apart by the drain board 3 from the washing space. In this way, the water with food residues can be firstly filtered by the drain board 3 before flowing back into the drain region 32, in order to prevent food residues from entering into the water pump 5 and blocking the water pump 5. Therefore, both the operating efficiency and the service life of the water pump 5 can be improved.

In this embodiment, the water pump 5 is an open water pump. The water pump 5 includes an impeller 51 and a guide bracket 52. The impeller 51 includes a hollow shaft 511 in the center and a plurality of blades 512 arranged on the circumferential surface of the shaft 511. The blades 512 are evenly distributed on the circumferential surface of the shaft 511 and extended in an axial direction. A lower end of the shaft 511 is connected to an output shaft 41 of the motor 4, and in this way, the impeller 51 can be driven to rotate when the motor 4 rotates.

The guide bracket 52 is provided outside the impeller 51. A plurality of mounting feet 521 are provided circumferentially on the guide bracket 52. The mounting feet 521 can be fixed to the bottom board 11, the box or the motor 4 by screws or the like. There is a gap between a bottom surface of the guide bracket 52 and a bottom surface of the drain region 32, and water inside the drain region 32 flows through the gap. The lower part of each blade 512 is located within a lower chamber 522 formed in the center of the guide bracket 52, and the upper part of each blade 512 is exposed out of the guide bracket 52.

A rotary spray arm 6 is supported and covered on the top of the guide bracket 52, located above the drain board 3. An upper chamber 61, for accommodating an upper portion of each of the blades 512, is formed on the bottom of the middle portion of the rotary spray arm 6. The lower chamber 522 of the guide bracket 52, the impeller 51 and the upper chamber 61 form the above said water pump 5 which is used for pumping water inside the drain region 32 to wash objects to be washed (dishes, vegetables, fruits and the like) by the rotary spray arm 6.

Alternatively, the water pump 5 can be a common closed water pump with a closed structure. Water inside the drain region 32 is drawn into the closed water pump and then pumped into the rotary spray arm 6 from the water outlets. That is, the rotary spray arm 6 still serves as the water outlet component of the closed water pump.

The rotary spray arm 6 includes an upper cover 62 and a lower cover 63, a flow channel communicated to the upper chamber 61 is formed between the upper cover 62 and the lower cover 63, the upper chamber 61 is located in the middle of the rotary spray arm 6, and the flow channel is located on two sides of the upper chamber 61. A plurality of water outlets 621 are formed on an upper surface of the upper cover 62. The water outlets 621 are located above the flow channel and correspond to the flow channel. The water pumped by the water pump 5 enters the flow channel from the upper chamber 61, and is then sprayed from the water outlets 621 to wash the objects to be washed.

Now referring to FIG. 4 and FIG. 5, the cover plate 2 includes an upper cover 21 and a lower cover 22 both made of glass and separated by a distance, and the upper cover 21 and the lower cover 22 are bound by a metal frame 23. The centers of the upper cover 21 and the lower cover 22 are transparent, accordingly a transparent observation window 222 is formed at a center of the cover plate 2, by which the user can see the washing progress or the degree of cleanliness conveniently.

The metal frame 23 of the lower cover 22 has at least one air vent 223 in communication with the washing space, the lower cover 22 has an air outlet 24 on the side of the lower cover 22 in communication with the outside, the air vent 223 and the air outlet 24 are connected by a pipeline 25. Therefore, the air pressure inside and outside of the washing space is kept balanced. The pipeline 25 can be hidden in the metal frame 23 to keep the appearance nice.

A rear side of the cover plate 2 is rotatably connected to the top of the sink body 1 by a shaft 26. The shaft 26 includes two shaft arms 261 respectively located at two sides of the metal frame 23 and attached to the metal frame 23, a hollowed positioning bracket 262 with two ends located between the two shaft arms 261 and attached to the sink body 1, and two damping shafts 263 respectively disposed inside the hollowed positioning bracket 262 and at each end of the positioning bracket 262. Each damping shaft 263 includes a sleeve 2632 attached to the positioning bracket 262 and a core 2631 located in the sleeve 2632, and an end of the core 2631 is inserted into one shaft arm 261 and engaged with the shaft arm 261. The outer side of the sleeve 2632 is relatively fixed with the positioning bracket 262, for example, by means of positioning mechanism, in detail, ridges extending in the axial direction are provided on the outer side of the sleeve 2632, slots extending in the axial direction are formed on the positioning bracket 262 at corresponding portions, and the ridges are fitted with the slots so that the sleeve 2632 is relatively positioned with the positioning bracket 262. The space between the core 2631 and the sleeve 2632 is filled with liquid which can increase the resistance between them, preferably silicone oil, in order to increase the resistance between the core 2631 and the sleeve 2632, so that the rotating speed of the core 2631 can be appropriately reduced when it rotates relative to the sleeve 2632. Multiple positioning pins 264 are disposed at intervals on a bottom of the positioning bracket 262, and multiple positioning holes are formed on the top of the sink body 1 at corresponding positions to the positioning pins 264, so as to make the cover plate 2 positioned relative to the sink body 1. The positioning bracket 262 and the sink body 1 can be fixed by screws or the like.

A handle 27 is provided on the front side of the cover plate 2, by which the cover plate 2 can be manually opened or closed conveniently.

A recessed step 12 is provided on an inner circumference of a top of the sink body 1, and a seal 28 matching with the step 12 is disposed on a circumference of a bottom of the metal frame 23 of the cover plate 2, and the cover plate 2 is connected with the step 12 of the sink body 1 in a sunken manner. And the upper cover 21 of the cover plate 2 is flushed with or slightly lower than an outer edge of the top of the sink body 1. Therefore, an effective sealing is formed between the cover plate 2 and the sink body 1 by the seal 28, thereby preventing water in the sink body 1 from sputtering. Due to the arrangement of the step 12, even if insufficient sealing occurs because of the ageing of the seal 28, the leaked water can be limited in the step 12 without sputtering from the sink body 1. After the cover plate 2 is covered, the upper cover 21 is flushed with the outer edge of the top of the sink body 1, so that, the surface of the cover plate 2 can serve as a workbench regardless of whether the washing machine is in a working state or a limited state.

The invention claimed is:

1. A sink-type washing machine comprising:
    a sink body having a washing space and a bottom portion, the sink body having a recess, the recess defining a drain region at least at a center of the bottom portion, the bottom portion of the sink body comprises a bottom board, the recess is formed at a center of the bottom board;
    an ultrasonic generator disposed on the bottom board;
    a water pump disposed inside the drain region for pumping water in the drain region, the water pump having a flow channel and an impeller;
    a cover plate rotatably connected on the sink body;
    a drain board with a plurality of drain holes disposed inside the sink body and covering the recess of the bottom board, the recess under the drain board forming the drain region;
    a rotary spray arm with a plurality of water outlets disposed above the drain board, the plurality of water outlets being in communication with the flow channel in the water pump,
    wherein the water in the drain region can be sprayed into the washing space and above the drain region,
    the impeller further comprises a central shaft and a plurality of blades disposed on a circumferential surface of the central shaft, each blade having a curvy part and a straight part, the straight part extending axially away from the central shaft, and
    the drain board further defines a circular opening and a residue basket is disposed in the sink body, under the circular opening and flushed with the drain board, and a surface of the drain board is flushed with the bottom board of the sink body around the drain board.

2. The washing machine of claim 1, wherein, the bottom board has a hole at a center and a box is disposed under the hole of the bottom board; the drain board covers the box, a space inside the box forms the drain region.

3. The washing machine of claim 1, wherein, the cover plate comprises an upper cover and a lower cover both made of glass and separated by a distance, and the upper cover and the lower cover are bound by a metal frame; a transparent observation window is formed at a center of the cover plate.

4. The washing machine of claim 3, wherein, the metal frame has an air vent in communication with the washing space and an air outlet in communication with outside, the air vent and the air outlet are connected by a pipeline.

5. The washing machine of claim 3, wherein, a recessed step is provided on an inner circumference of a top of the sink body, and a seal matching with the step is disposed on a circumference of a bottom of the metal frame of the cover plate, and the cover plate is connected with the step of the sink body in a sunken manner.

6. The washing machine of claim 5, wherein, the upper cover of the cover plate is flushed with an outer edge of the top of the sink body.

7. The washing machine of claim 5, wherein, a rear side of the cover plate is rotatably connected to the top of the sink body by a second shaft.

8. The washing machine of claim 7, wherein, the second shaft includes two shaft arms respectively located at two sides of the metal frame and attached to the metal frame, a hollowed positioning bracket with two ends located between the two shaft arms and attached to the sink body, and two damping shafts respectively disposed inside the hollowed positioning bracket and at each end of the positioning bracket, each shaft arm is engaged with one damping shaft.

9. The washing machine of claim 8, wherein, each damping shaft includes a sleeve attached to the positioning bracket and a core located in the sleeve, and an end of each core is inserted into the respective shaft arm and engaged with the respective shaft arm.

10. The washing machine of claim 8, wherein, multiple positioning pins are disposed at intervals on a bottom of the positioning bracket, and multiple positioning holes are formed on the top of the sink body at corresponding positions to the positioning pins, so as to make the cover plate positioned relative to the sink body.

11. The sink-type washing machine of claim 1, wherein the residue basket is in communication with a water drain pipe.

12. The sink-type washing machine of claim 1, further comprising a heater disposed in the sink body and under the drain board.

13. The sink-type washing machine of claim 1, wherein the residue basket is disposed off center from an axis defined by the impeller.

\* \* \* \* \*